United States Patent [19]
Poppe et al.

[11] 3,778,834
[45] Dec. 11, 1973

[54] DIRECTION FINDER CALIBRATION SYSTEM

[75] Inventors: Dag Poppe, Gjettum; Gunnar Viggo Odegaard, Simensbraten, both of Norway

[73] Assignee: International Standard Electric Corporation, New York, N.Y.

[22] Filed: May 4, 1972

[21] Appl. No.: 250,274

[30] Foreign Application Priority Data
May 7, 1971 Norway.................................... 1732

[52] U.S. Cl.................................. 343/119, 343/120
[51] Int. Cl................................................. G01s 3/34
[58] Field of Search............................ 343/119, 120

[56] References Cited
UNITED STATES PATENTS
2,473,491  6/1949  Posthumus........................... 343/120
2,607,034  8/1952  Goldstein........................ 343/113 R
3,028,600  4/1962  Bailey................................. 343/119

Primary Examiner—Maynard R. Wilbur
Assistant Examiner—Richard E. Berger
Attorney—C. Cornell Remsen, Jr. et al.

[57] ABSTRACT

An updating (calibration) system for two channel direction finders comprising two loop antennas and a reference (sense) antenna. Individual receivers connect each of the two loop antennas to bearing measuring means and means are included for updating the gain and phase of the two receivers to equality. Apparatus is also included for interconnecting the input of the two receivers during the updating mode of operation to facilitate calibration (equalization) of the channels. A common signal source which is either the reference (sense) antenna or the one of the two loops having the greatest signal at the time, is applied to both signals through artificial antenna devices which are actually equalizers for calibration purposes.

8 Claims, 9 Drawing Figures

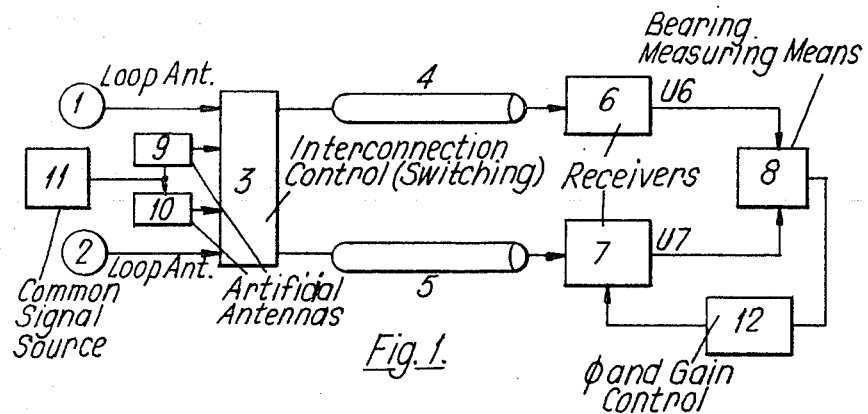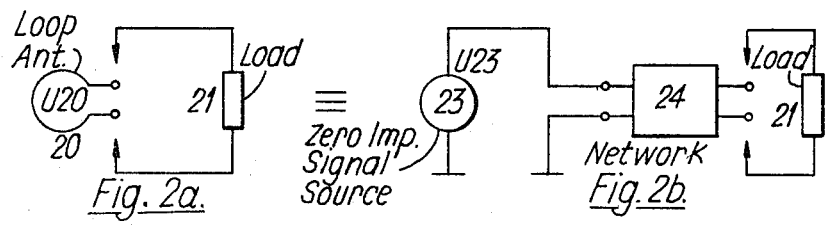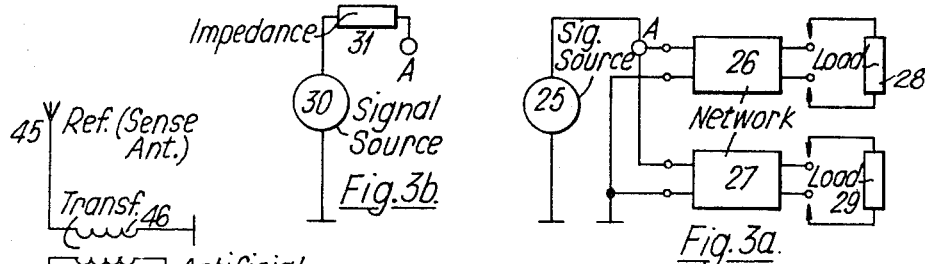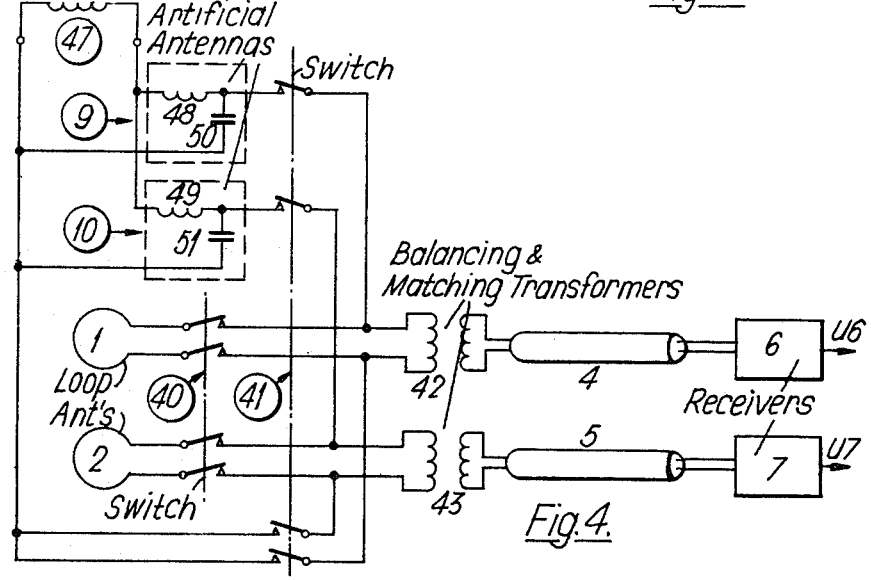

3,778,834

DIRECTION FINDER CALIBRATION SYSTEM

CROSS REFERENCE TO RELATED APPLICATIONS

This application is filed under the provisions of 35 U.S.C.119 with claim for the benefit of the filing of an application covering the same invention filed May 7, 1971, Ser. No. 1732/71, in NORWAY.

BACKGROUND OF THE INVENTION

1. Field of the Invention

This invention relates to systems for calibrating (equalizing) the gain and phase characteristics of dual channel direction finder systems.

2. Description of the Prior Art

In two channel direction finders of the type herein described, it has been common practice for many years to update or adjust or calibrate the gain and phase of the two receiver channels to equality before bearings are taken. This is basically described on Page 886 in Terman's: "Radio Engineer's Handbook," printed in 1943.

As described on Pages 474–481 R. Keen's book "Wireless Direction Finding" printed in 1947, the small loop system is very flexible insofar as choice of the position of the loops is concerned, and these may therefore be placed at a considerable distance from the receivers. The distant loops, however, require carefully selected cables and transformers placed between the loops and the receivers.

Normally a two channel direction finder is updated by connecting the inputs of the receivers to a common signal source. When such a simple system is used, either the input impedance of the two channels must be identical over the whole frequency band or they must be high compared to the source impedance.

The latter condition is commonly satisfied by using a vacuum tube preamplifier ahead of the tuned circuits of the receiver. This method does, however, involve certain drawbacks, since semiconductors on the market today cannot completely replace the vacuum tube circuit because of their finite input impedance, cross modulation, limited dynamic range and susceptibility to damage due to transient voltages. It is desirable, therefore, to have filters ahead of the first transistor amplifier at the actual receiver inputs, the filter impedance matching the antenna cables for the desired frequency band. It will not be possible to obtain complete tracking between input impedances over the whole frequency band, or between antenna cables, so that the loop antennas will feed into non-identical impedances. A simple connection of the filters or antenna cables to a common signal source for updating is therefore not equivalent to separate connection of each receiver to its respective loop, when both loops deliver signals of equal strength.

U.S. Patent application Ser. No. 212,531, filed Dec. 27, 1971, now U.S. Pat. No. 3,735,410, is pertinent in understanding the subject of receiver channel calibration or updating.

SUMMARY OF THE INVENTION

It may be said to be the general object of the present invention to eliminate the drawbacks of previous solutions for effecting the necessary interconnection of the two receivers.

The main feature of the invention is that, during updating, the two receiver inputs are interconnected via unique artificial antenna circuits to a common signal source, while there respective loop antennas are disconnected.

The loop antennas are assumed to be identical in pick-up characteristics and equivalent source impedance. The selected, balanced cables leading from the loops to the receivers are usually assumed to be identical for short cable lengths. For longer lengths, these cables may differ significantly in characteristics. The present invention will enable the user to eliminate tracking errors between cables and receiver input circuits by taking these into consideration during the updating process over the useful frequency band.

A further feature of the invention is that the interconnection means are arranged at the antenna base, so that the cables leading from the loop antennas to the receivers are included in the updating circuitry and their possibly unequal characteristics therefore automatically compensated.

Only passive networks are placed at the antenna base, this being of particular importance because the loop antennas can thereby be placed free of restrictions at a place little influenced by spurious reflections, such as from stays, superstructure, other antennas, etc. The loop antennas may, for example, be placed at the top of the mast, but complex circuits are not thereby located at such a place where service would be difficult. The channel updating system of the present invention results in higher system accuracy and reliability.

The above-mentioned and other features and objects of the present invention will be understood from the following detailed description of embodiments of the invention, taken in conjunction with the drawings.

BRIEF DESCRIPTION OF THE DRAWINGS

FIG. 1 shows a block diagram of an updating system.

FIGS. 2a, 2b, 3a and 3b are sketches referred to in discussion of circuit theory and background of the artificial antennas employed in the invention.

FIG. 4 schematically shows an embodiment of the invention.

DESCRIPTION OF THE PREFERRED EMBODIMENTS

Figure 5:
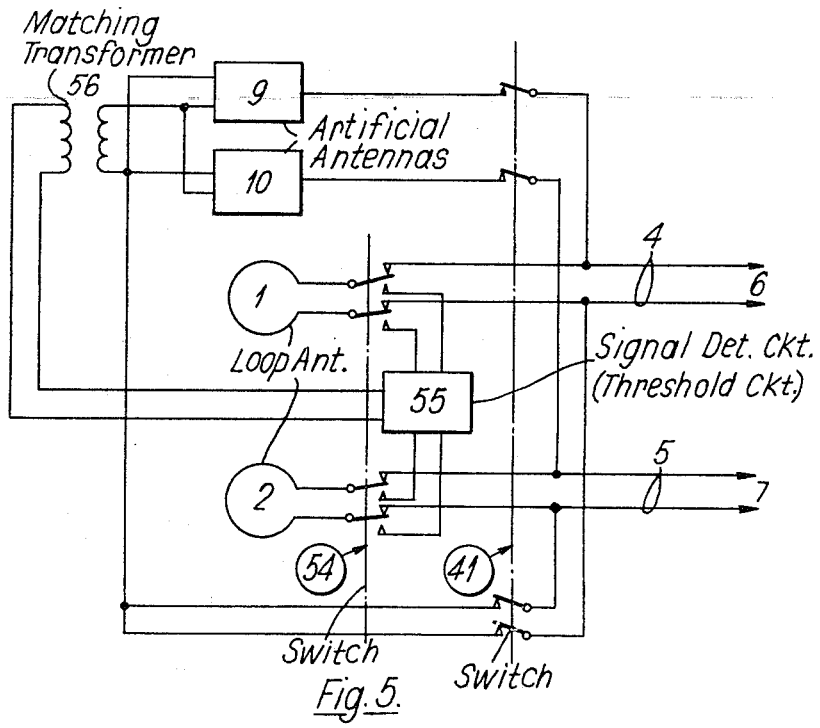
FIG. 5 shows a further embodiment of the invention.

Referring now to FIG. 1, two loop antennas 1 and 2 are shown connected via interconnection means 3 and individually balanced cables 4 and 5 to respective receivers 6 and 7. The outputs from the receivers 6 and 7 are fed to bearing measuring means 8. During actual taking of bearings, the signals detected by the two loop antennas 1 and 2 are fed directly to the respective receivers 6 and 7. The bearing is measured and displayed on a cathode ray tube or a digital display device (not shown). Sense is determined by signals from a separate sense antenna, and quadrantal errors are corrected by other circuitry (not shown). During updating (calibration) of the receiver channels, the two loop antennas are disconnected by circuits in 3 and the inputs to the receivers 6 and 7 are connected via artificial antenna circuits 9 and 10 to a common signal source 11. The updating process is instrumented by gain and phase updating means 12, which compares the output signals from the receivers 6 and 7 and controls the phase and gain of the receiver 7 until equality is obtained. The aforementioned U.S. Patent application Ser. No. 212,531, filed Dec. 27, 1971 is pertinent in respect to those particular circuits.

A two channel direction finder will only give correct bearings when the ratio of the receiver output signals (U6/U7) is equal to a known factor times the ratio of the signals induced in the loops, i.e., K (U1/U2). For simplicity, the factor K may be set to unity so that U6/U7 = U1/U2.

During an updating period, the above equation is satisfied by adjusting the phase and gain of the receiver 7 to compensate for variations in circuit and environmental conditions. The receiver input filters cannot be directly interconnected to the common signal source 11, if accurate results are desired, because the impedance mismatches occur. The interconnction to a common signal source must therefore be effected via artificial antenna circuits 9 and 10 having the impedances matching the loops.

In FIG. 1, the interconnecting means 3 is shown placed at the antenna end of the cables 4 and 5. This is considered to be necessary when the cables are long and represent unequal impedances in addition to the unequal filter impedances. When, however, the antenna is placed relatively close to the receivers, the updating interconnection (switching control) means 3 may also be placed relatively close to the receivers, thereby ignoring the antenna cables during the updating process.

The theoretical background for insertion of the artificial antennas will be described in the following.

In FIG. 2a a loop antenna 20 may be connected to a load 21. The signal induced in the loop is called U20. It is assumed in FIG. 2b that, within a given frequency range, the loop antenna 20 may be replaced by a signal source 23 of zero impedance and a four terminal network 24. The network 24 would be such that the voltages developed across the loads 21 in FIG. 2a and FIG. 2b would be identical, when identical signals (U20 and U23) are induced in the loop 20 and the signal source 23.

When considering interconnection of two loop simulating circuits of the type illustrated in FIG. 2b, it is clear that when the impedance of the source 23 is zero, one and the same source (25, FIG. 3a) may be used for both four terminal networks (26,27 of FIG. 3a). This is illustrated in FIG. 3a where the networks 26 and 27 are respectively connected to loads 28 and 29. One input terminal to each network is interconnected at A to a signal source 25. It will now be seen that it is not necessary to require that the source impedance be zero, because the voltage ratio of the signals delivered to the loads 28 and 29 respectively is not affected by the source impedance. The zero impedance source 25 may therefore be replaced by a source 30 having a realistic impedance 31, FIG. 3b.

In FIG. 4 an embodiment of a circuit of the channel updating system according to the present invention is shown schematically. Circuit components corresponding to components in FIG. 1, are given the same designations.

When a switch 40 is closed and a switch 41 is open, the two loops, 1 and 2, are connected to the receivers 6 and 7, respectively, via balanced transformers 42 and 43 and balanced cables 4 and 5, respectively.

In the updating mode, the switch 40 is open while the switch 41 is closed. It will be seen that the two transformers 42 and 43 are now interconnected via artificial antenna networks 9 and 10 and an additional transformer 46 to a common source, i.e., the reference (sense) antenna 45. The impedance 47 seen looking into the transformer 46 is identical with the impedance 31 in FIG. 3b, if the four terminal networks of FIGS. 3 and 4 are identical.

It has been found that, within the ordinary DF-band, a loop antenna will be fairly well simulated by inductances (48,49) and capacitances (50,51) connected as indicated in FIG. 4.

In an alternative embodiment of the invention, the third signal source 11 in FIG. 1 may be constituted by a circuit detecting and connecting the loop having the strongest signal to the aritificial antenna circuits. This is indicated in FIG. 5 where the loops 1 and 2, instead of being isolated during updating, are connected by a switch 54 to a signal detecting circuit 55. The strongest loop signal is detected by a threshold circuit and applied via a transformer 56 to the artificial antennas 9 and 10. The switches 41 and 54 are illustrated in conditions in which bearings are taken. During updating the switch 41 is closed.

The antenna cables 4 and 5 lead to the receivers 6 and 7 as in FIG. 4 or, if the cables are short, the switching arrangement 40, 41 in FIG. 4 and 54, 41 in FIG. 5, could be placed at the receiver side of the cables.

The switches should preferably be of the sealed type (or solid state type) when placed at the antenna base. Ordinary electro-mechanical relays may be used when placed near the receivers. The operating circuits for the relays are controlled automatically from the receivers.

In the following, the error introduced during the updating process due to inequality between the loop impedances and the artificial antennas will be considered.

Figure 6:
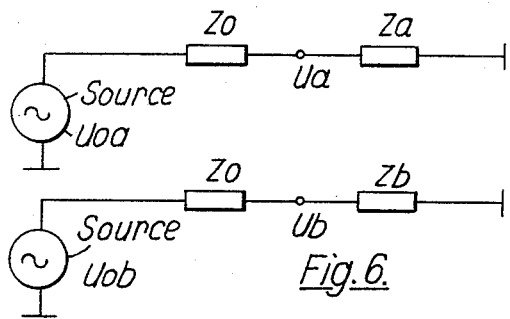
FIGS. 6 and 7 are sketches for consideration of inequality between the loop antennas and the artificial antennas.

In FIG. 6, let $U_{oa}$ and $U_{ob}$ be the voltages measured at the respective loop antennas when not loaded, and $Z_o$ be the internal impedance of each, (assumed to be equal for both loops). $Z_a$ and $Z_b$ are the respective load impedances, as presented to the loop terminals by the receiver input filters and antenna cables. Let $U_a$ and $U_b$ be the load voltages on $Z_a$ and $Z_b$, respectively, when $U_{oa} = U_{ob}$.

The ratio $N_1 = U_a/U_b$ may then be expressed as:

$$N_1 = U_a/U_b = (Z_a/Z_b)\ (Z_o + Z_b/Z_o + Z_a) \tag{1}$$

Figure 7:
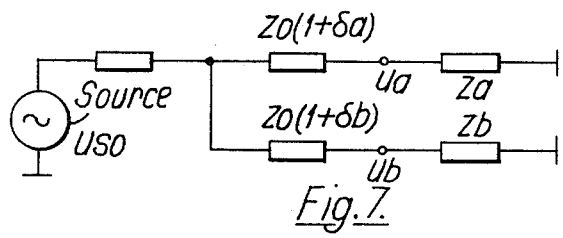

During updating, a common source, $U_{so}$ (FIG. 7), with a negligible source impedance is connected to the common input of the artificial antennas having impedances $Z_o (1 + \delta a)$ and $Z_o (1 + \delta b)$ respectively, $\delta a$ and $\delta b$ representing the vectorial errors.

The ratio $N_u = U_a/U_b$ during updating is:

$$N_u = (Z_a/Z_b)(Z_o(1 + \delta b) + Z_b/Z_o(1 + \delta a) + Z_a) \tag{2}$$

The updating error may now be expressed as $N_1/N_u = p$ $$p = N1/Nu = (Zo + Zb/Zo + Za)(Zo(1 + \delta a) + Za/Zo(1 + \delta b) + Zb) \quad (3)$$

or normalized to Zo when $$za = Za/Zo \text{ and } zb = Zb/Zo,$$

$$p = N1/Nu = (1 + zb/1 + za)(1 + \delta a + za/1 + \delta b + zb)$$

$$= (1 + \delta a/1 + za)(1/1 + \delta b/1 + zb) \quad (4)$$

This expression will be considered in more detail in an example: In the frequency band of interest, it may be assumed to a fairly good approximation, that $Zo$ is a pure reactance $jR$. Further the ohmic value of $Za$ ($Zb$) is chosen to be approximately R, while the reactive part may have a value $jX$; so that $Za(Zb) = R + jX$ $$za = Za/Zo = (R + jX/jR) = x/R - j, \quad (5)$$

$$\text{and } (1 + za) = 1 + x/R - j \quad (6)$$

which has a minimum for $x = -R$. Accordingly, $$|1 + za| \min = 1, \text{ and likewise}$$

$$|1 + zb| \min = 1. \quad (7)$$

Because $|\delta a|$ and $|\delta b|$ both are small compared to unity, equation 4 may be expressed as follows:

$$p \approx (1 + \delta a/1 + za)(1 - \delta b/1 + zb) \approx 1 + (\delta a/1 + za) - (\delta b/1 + zb)$$

Considering now equation 7 and introducing a value $\delta$ which is larger or equal to $\delta a$ and $\delta b$ ($|\delta a| \leq |\delta|$ and $|\delta b| \leq |\delta|$) the updating error $p$ will, in the worst case, be:

$$|p| \leq 1 + 2|\delta| \quad (8)$$

Thus if $\delta = 0.01$, $|p| \leq 1.02$, which is small enough to be an acceptable value.

Finally, the impact of $|p|$ on the measured bearing angle $\alpha$ will be considered. The bearing angle $\alpha$ is expressed as $tg\alpha = K(Ua/Ub)$, which will be regarded as the correct expression for $\alpha$ if no error was introduced in the updating. The error factor alters the correct bearing $\alpha$ to $\alpha'$ such that $$tg\,\alpha' = |p|\,tg\alpha \quad (9)$$

(The error due to $p$, being a complex value, is negligible when $p$ is small, i.e., within a few degrees). An expression for the bearing angle error is:

$$tg(\alpha' - \alpha) \approx (\alpha' - \alpha) \approx \frac{tg\alpha' - tg\alpha}{1 + tg\alpha'\,tg\alpha}$$

$$= \frac{(|p| - 1)tg\alpha}{1 + |p|tg^2\alpha} \approx (p - 1)\left(\frac{tg\alpha}{1 + tg^2\alpha}\right), \quad (10)$$

which has a maximum for $\alpha = 45°$, and in that case reduces to:

$$\alpha' - \alpha = |p| - 1/2 \quad (11)$$

Considering now expression 8, it is seen that $|p| - 1/2 \leq \delta$, so that:

$$\alpha' - \alpha \leq \delta \text{ (in radians)} \quad (12)$$

Again, if $\delta = 0.01$, the bearing angle error in the worst case would be about 0.5°. Errors which would exist without the artificial antennas according to the invention would be substantially larger.

It should be emphasized that the above description and the drawings are typical and illustrative of the invention but are not intended to be considered as limiting the scope of the invention.

What is claimed is:

1. In a direction finding system having two loop antennas each connected to a discrete corresponding receiver channel and a reference antenna, and including bearing measuring and indicating means connected to the outputs of said receivers for bearing measurement, the combination comprising:
   gain and phase control means connectable and operable to produce equality of gain and phase characteristics of said receiver channels;
   a common source of energy in the frequency band of said direction finding system;
   a pair of artificial antenna circuits each adapted for impedance matching and isolation of a corresponding one of said receiver channel inputs;
   switching means for implementing a calibration updating mode of operation, said switching means being adapted to connect said receiver inputs to said common source of energy each through a corresponding one of said artificial antennas while contemporaneously enabling said gain and phase control means.

2. Apparatus according to claim 1 in which said common source of energy is the reference antenna of said system.

3. Apparatus according to claim 1 including a threshold circuit enabled by said switching means during said calibration mode for determining the greater of the signals from said loop antennas at the time, and for connecting said greater signal loop output to said artificial antenna circuits to provide said common source of energy.

4. Apparatus according to claim 1 including cables connecting each of said loop antennas to its corresponding receiver input, and further defined in that said switching means are located proximate said loop and reference antennas thereby to include said cables in the signal path during said calibration updating mode of operation.

5. Apparatus according to claim 1 in which said common source includes a pair of terminals across which its signal is extant, and said artificial antenna circuits each include a series inductor and capacitor connected across said terminals and during said calibration mode of operation each corresponding receiver channel input is fed by the signal extant across said capacitor in the corresponding one of said artificial antenna circuits.

6. Apparatus according to claim 5 including an impedance matching transformer connected to effect a predetermined impedance transformation between said common source and said terminals, whereby said terminals present a low impedance drive for said artificial antennas during said calibration updating mode of operation.

7. Apparatus according to claim 6 in which said common source is said reference antenna.

8. Apparatus according to claim 6 including a threshold circuit and in which said switching means connects said loop antennas exclusively to said threshold circuit whereby the output of said threshold circuit is the greater of the output signals of said two loop antennas, said switching circuit further operating to cause said threshold circuit output to be extant at said common source terminals.

* * * * *